United States Patent
Galovich

(10) Patent No.: US 6,560,709 B1
(45) Date of Patent: May 6, 2003

(54) METHOD AND APPARATUS FOR THE TRANSFER OF SENSITIVE CARD DATA OVER AN UNSECURE COMPUTER NETWORK

(75) Inventor: David J. Galovich, Schaumburg, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/302,518

(22) Filed: Apr. 30, 1999

(51) Int. Cl.[7] .................................................. G06F 11/30
(52) U.S. Cl. ........................ 713/185; 713/168; 713/172; 713/179
(58) Field of Search ................................. 713/168, 172, 713/179, 185, 132

(56) References Cited

U.S. PATENT DOCUMENTS

| 5,550,561 A | 8/1996 | Ziarno |
| 5,625,534 A | 4/1997 | Okaya et al. |
| 5,754,655 A | 5/1998 | Hughes et al. |
| 5,768,382 A * | 6/1998 | Schneier et al. ............ 380/251 |
| RE36,310 E * | 9/1999 | Bjerrum ...................... 380/25 |
| 6,067,620 A * | 5/2000 | Holden et al. .............. 713/155 |

* cited by examiner

Primary Examiner—Thomas R. Peeso
(74) Attorney, Agent, or Firm—McDonnell Boehnen Hulbert & Berghoff

(57) ABSTRACT

An apparatus and method for the secure transmission of credit card data over an Internet connection. The apparatus includes a card reader for reading credit card data and is adapted for connecting to a network device, such as a personal computer. The card data are encrypted in an encryption circuit and transmitted over an Internet connection. The network device is unable to read the card data and so programs running on the network device cannot surreptitiously record the card data and later transmit it to a data thief. The isolation of the network device and the card reader provides for the secure and direct transmission of card data to the intended electronic merchant.

34 Claims, 7 Drawing Sheets

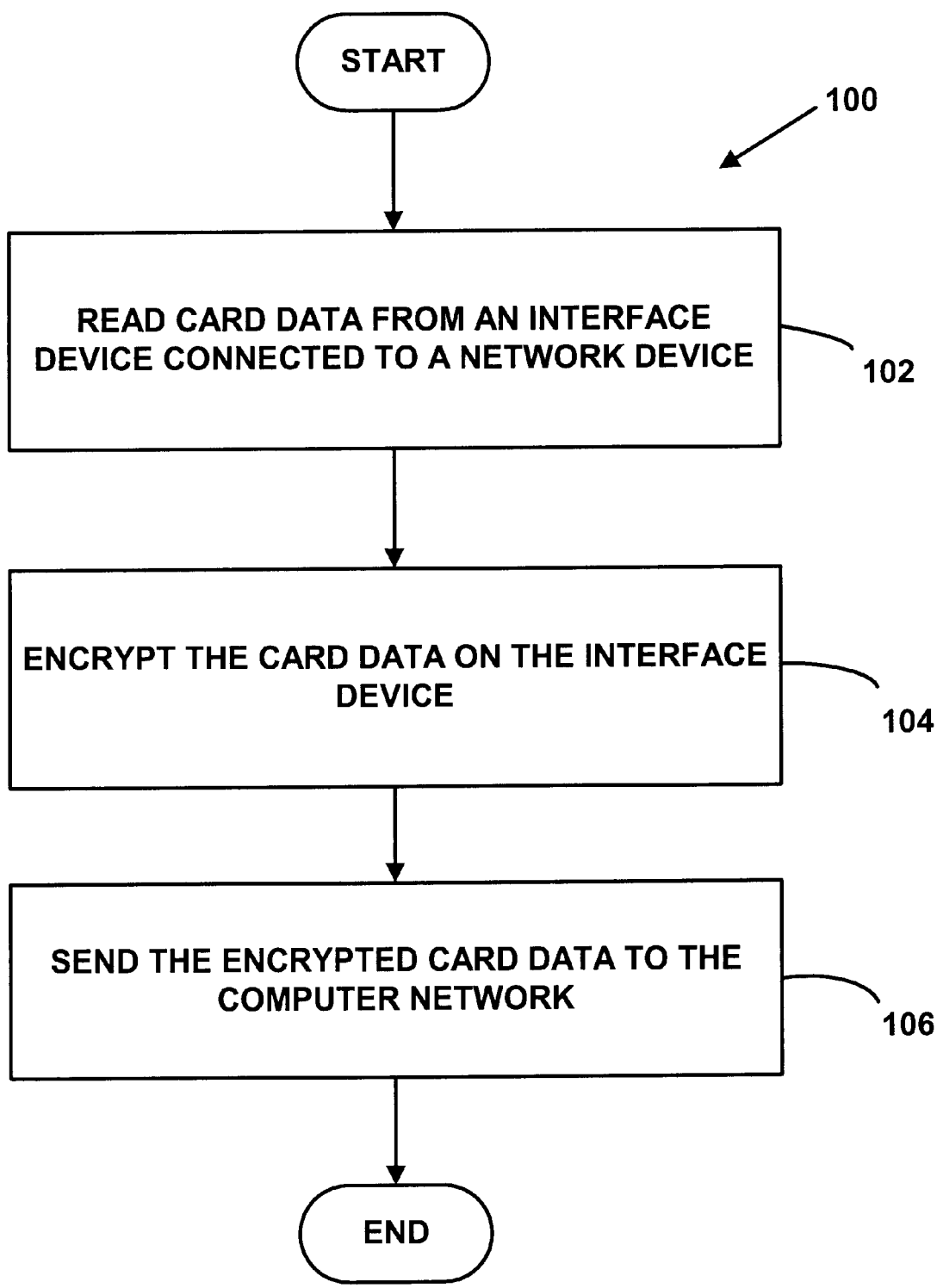

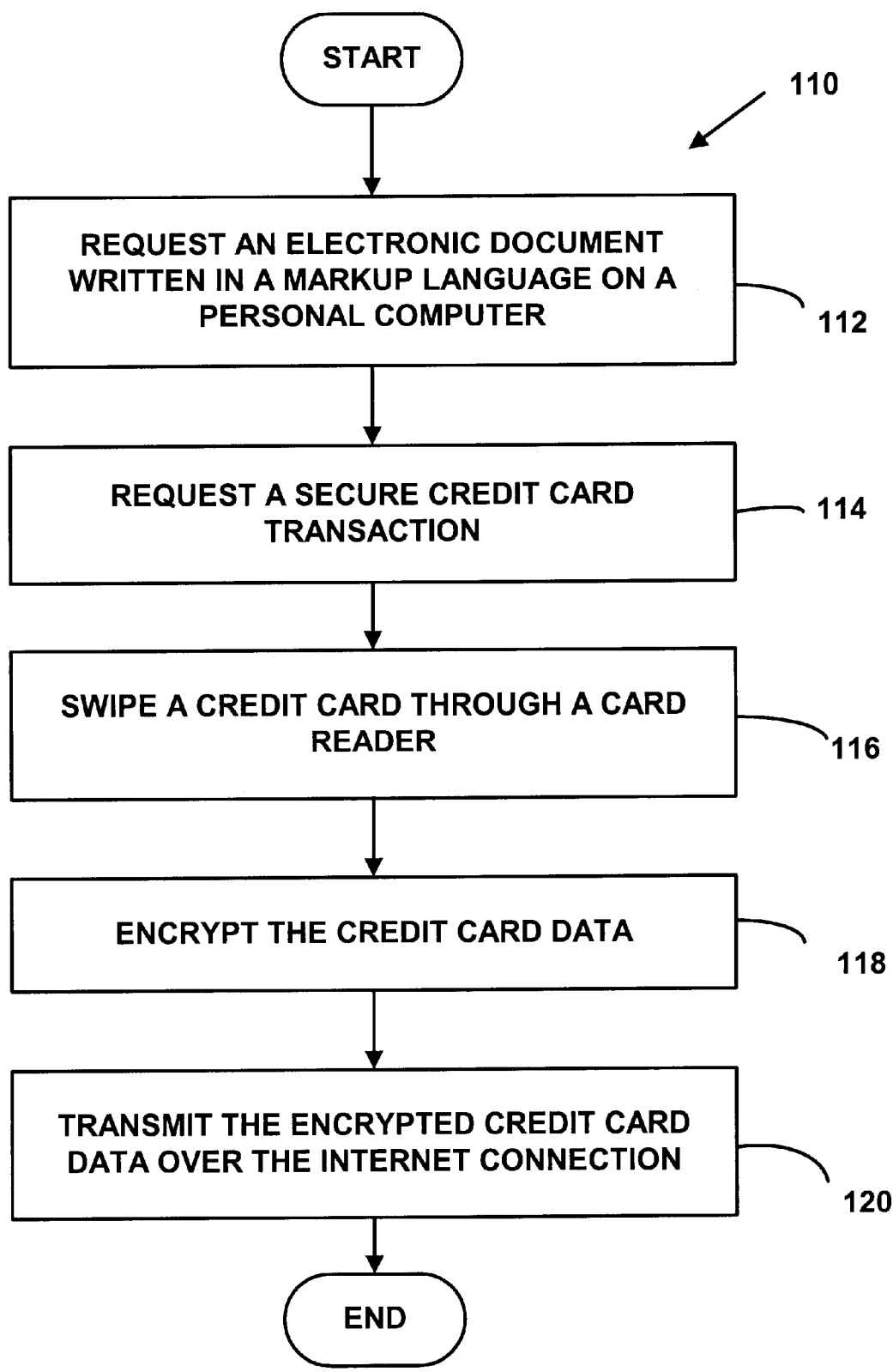

METHOD AND APPARATUS FOR THE TRANSFER OF SENSITIVE CARD DATA OVER AN UNSECURE COMPUTER NETWORK

FIELD OF INVENTION

The present invention relates to the transfer of electronic data over an unsecure data link. More specifically, it relates to a method and apparatus for the secure transmission of magnetically readable card data over the Internet, or other computer network.

BACKGROUND OF THE INVENTION

A card is essential to many daily transactions. For instance, a growing number of commercial transactions, from purchasing goods, to hiring a car, are primarily accomplished via credit cards or direct debit cards. Also, a variety of medical services, from treatment to the dispensation of drugs, require a patient to provide a health insurance card or a drug authorization card. The data on these cards may be highly sensitive. For example, details of a patient's medical history can be coded on drug prescription cards to prevent adverse drug reactions, and credit card data provide the necessary authorization to receive goods or services on credit. Both purchaser and retailer, patient and clinic, demand that the card data remain secure during transmission down a data link.

The Internet is a worldwide network of interconnected computers and is gaining acceptance as a medium for commercial transactions. Many personal computers in the home include modems for connecting the consumer to an Internet Service Provider, such as America On-Line, via a telephone line. Consumers are increasingly using the Internet for their commercial, medical, and other personal transactions. Examples of transactions over the Internet include on-line banking, on-line shopping, buying and selling stock, student loan repayment, customer account management, identification, and verification that a consumer has adequate insurance.

Although Internet commerce is gaining acceptance, consumers are nonetheless concerned about the security of their sensitive data over telephone lines and over the Internet. Many businesses using the Internet require consumers to submit credit card numbers or other sensitive data, such as social security numbers or other identity numbers, in order to receive service. The relative anonymity of Internet transactions can heighten consumer anxiety that sensitive information may end up in unintended hands. Consumer anxiety may dampen the growth of Internet commerce.

Consumer fears are not unfounded; the Internet is not a secure computer network. For example, consider the purchase of goods from a retailer's World Wide Web page. Upon selecting the goods, the consumer is asked to type his or her name, credit card number, and the card's date of expiration into an interactive web page. The web browser software typically encrypts the data and outputs the encrypted data to a modem for transmission down a telephone line. The data packets travel on the Internet and pass through several other computers and routers on their way to their destination. Anybody can read the encrypted card data at any of the nodes on the Internet and make a copy of the data for identification purposes or for later illegitimate use. Moreover, some older browsers do not support encryption and any credit card data can then be directly read from the data packets and even directly read from the telephone line.

Although the data is usually encrypted and secure on the telephone line, the consumer may still be wary of passing sensitive information through a global network of computers. One reason for the wariness is psychological: the consumer enters the data to the web page in a manner that he or she may perceive as being open to fraud. Many credit card frauds operate by persuading consumers to provide data to a sham retailer. In these frauds, the consumer typically reads, over the telephone, the data embossed into a credit card, or fills out a false authorization form. The sham retailer then uses the number to make unauthorized charges against the consumer's credit or bank account. Entering the data to a web page appears to be no different.

Secondly, some web browsers may be vulnerable to attack by a program that captures keystrokes. Such a program, popularly referred to as a "Trojan horse," could be downloaded from a web site to the consumer's personal computer without his or her knowledge. The program can reside in memory and operate to record the keystrokes of the consumer and in particular the keystrokes made as the consumer enters the card data to a genuine and legitimate commercial web page. Again without the knowledge of the consumer, the program can send the captured data via the Internet to an address where a data thief can reconstruct the unencrypted card data. In this situation, the consumer is often completely unaware that the data on the card have been compromised. This threat to security is presently unperceived. It could ultimately destroy consumer confidence in Internet transactions involving sensitive data.

Moreover, a determined data thief can tap a telephone line or circumvent the security of a public switched telephone network and record or otherwise acquire modem traffic. A public switched telephone network, however, such as provided by AT&T and others, and telephone lines are usually secure from eavesdropping. But if the data are not encrypted, the thief may extract the information or at least sufficient information to construct a sham request for authorization. Applying encryption techniques to the data, however, does prevent a thief from unscrambling the sensitive data from the traffic on a telephone line. These perceived weaknesses in the security of Internet commerce may be overcome both electronically and psychologically by a direct encryption and transmission of the data magnetically encoded in the card.

Although the consumer may be wary of Internet transactions, the consumer may still be comfortable with the familiar card transaction he encounters in a retail store. In this instance, data on a card are read when the card is swiped through a magnetic card reader. A telephone call is made to a predetermined telephone number and a modem connected to the magnetic card reader transmits the card data and transaction data to an authorization server. The authorization server identifies the card, verifies that the card is valid, and determines whether the consumer is authorized for that particular transaction. Otherwise, the server denies the transaction. The modem receives the authorization or denial information from the authorization server and presents it to the retailer.

In this case, the card data are transmitted over another unsecure computer network: an ordinary telephone service. However, steps are taken to protect the security of the data on the telephone line. First, the consumer has possession of the card until the moment of the swipe and after the moment of swipe. Next, the consumer is physically present at the transaction and can verify the identity of the retailer. Next, the telephone number of the destination is predetermined and cannot be mimicked. Next, the data can be encrypted before modulation and transmission over the telephone line. Next, the data encoded on the magnetic card may be previously encrypted. Not only does this process provide valid authorization, but it also purports to protect the data on the card. It is difficult for the magnetic card data to be transmitted to a sham destination for later illicit use. The consumer has reason to believe that a card swipe transaction protects the sensitive data on the card on its travel to the authorization server.

Existing methods for transmitting card data on the Internet has two weaknesses: the first is that the consumer enters the data via a keyboard; the second is that the web browser performs the encryption. Encryption of the data on the computer is often too late because the security breach could have occurred at each keystroke. Additionally, consumers may prefer that the data on the magnetic card be entered in a manner with which they are already comfortable. It is therefore desirable to prevent the alteration, engraftation, or unintended manipulation of data over an unsecure computer network, such as the Internet or an ordinary telephone service. Protecting the security of magnetic card data may lead to greater use of the Internet as a medium for consumer transactions.

SUMMARY OF THE INVENTION

In accordance with preferred embodiments of the present invention, some of the problems associated with the secure transmission of card data are overcome. An apparatus for the secure transmission of card data over a computer network is provided. The apparatus is adapted for connecting to a network device. The apparatus includes a card reader including a card reader input for receiving data obtained from scanning a card, and a card reader output for sending data obtained from scanning a card. Scanned card data on the card reader are not readable by the network device. The apparatus further includes an encryption circuit configured for encrypting card data, including an encryption input connected to the card reader output and an encryption output. The apparatus yet further includes a data interface including a data interface input connected to the encryption output and a data interface output. The apparatus yet further includes a communications device including a communications device input connected to the data interface output and a communications device output connected to the computer network.

For example, the apparatus of the present invention may provide for the secure transmission of card data over a computer network such as the Internet. When the card reader scans a card, such as a magnetic card, a network device connected to the apparatus, such as a personal computer, cannot read the card data. Instead, an encryption circuit encrypts the card data and forwards it to the computer network, again without being accessible by the network device. This can help ensure that the card data are secure from programs on the network device that capture keystrokes and secure from electronic eavesdropping. However, the present invention is not limited to the Internet, magnetic cards, or personal computers, and other networks, cards, and network devices could be used.

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 7 is a flow diagram illustrating a method for the secure transmission of card data over a computer network in accordance with an exemplary preferred embodiment of the present invention; and FIG. 8 is a flow diagram illustrating method for the secure transmission of credit card data over an Internet connection in accordance with an exemplary preferred embodiment of the present invention.

DETAILED DESCRIPTION OF PREFERRED EMBODIMENTS

Figure 1:
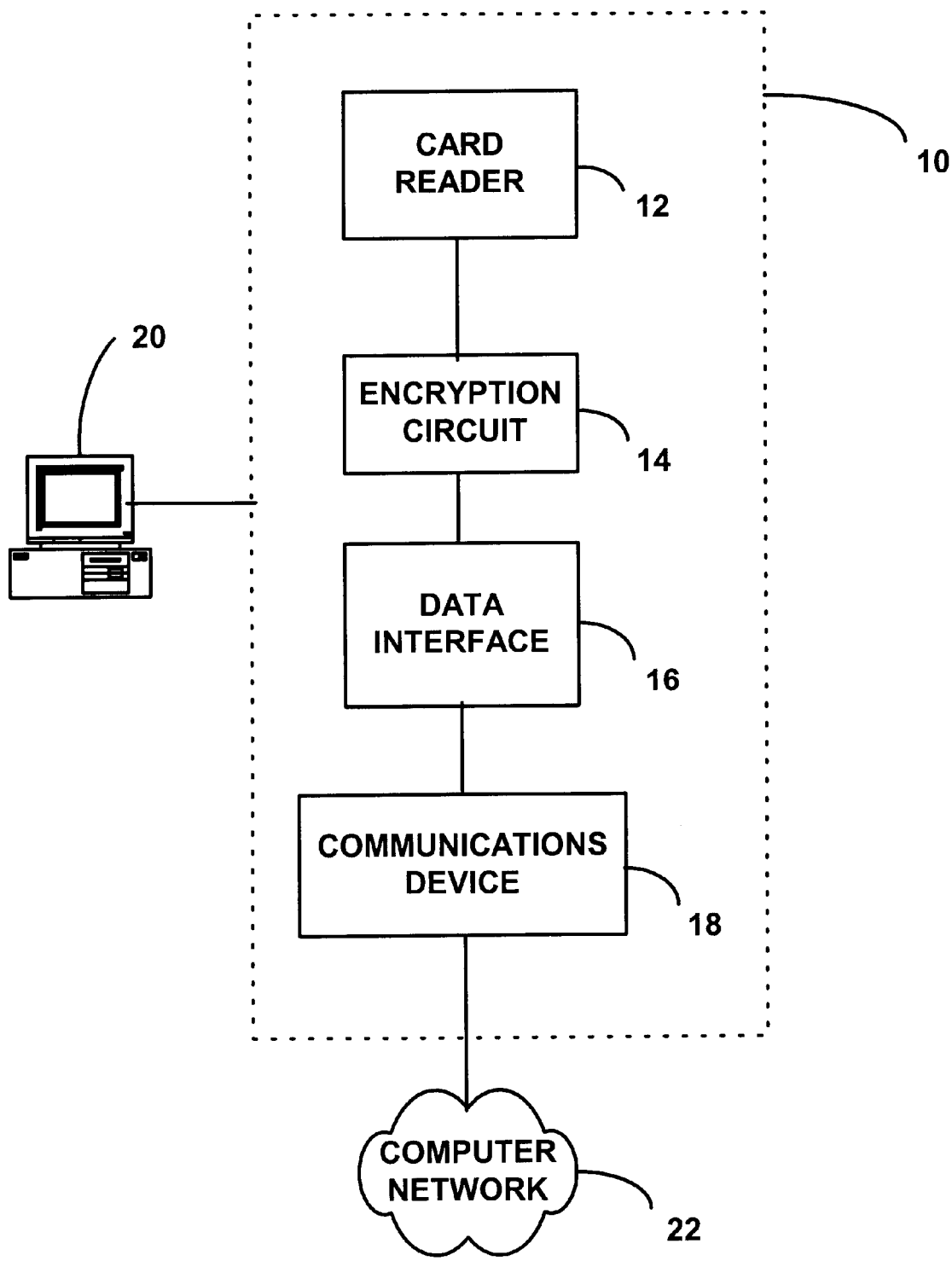
FIG. 1 is a block diagram illustrating an apparatus for the secure transmission of card data over a computer network in accordance with an exemplary preferred embodiment of the present invention.

FIG. 1 is a block diagram illustrating an apparatus for the secure transmission of card data over a computer network. The Apparatus 10 comprises in combination a card reader 12, an encryption circuit 14, a data interface 16, and a communications device 18. The Apparatus 10 is adapted for connection to a network device 20, and the output of the communications device 18 is adapted for connection to a computer network 22. The card reader 12 includes a card reader input for receiving data obtained from scanning a card, and the card reader 12 also includes a card reader output for sending data obtained from scanning a card. The scanned card data on the card reader 12 are not readable by the network device 20.

The encryption circuit 14 is configured for encrypting card data. The encryption circuit 14 has an encryption input and an encryption output. The encryption input is connected to the card reader output. The data interface 16 has a data interface input and a data interface output. The data interface input is connected to the encryption output. The communications device 18 has a communications device input and a communications device output. The communications device input is connected to the data interface output and the communications device output is connected to the computer network 22.

By way of example, the card reader 12 may be a magnetic card reader, the network device 20 may be a personal computer, the data interface 16 may be an Internet interface, the communications device 18 may be a modem, and the computer network 22 may be an Internet connection. Many other choices may be possible and are described in the following exemplary preferred embodiments.

The card reader is adapted to prevent the network device from reading scanned data. Programs on the network device 20 cannot intercept the scanned data and affect the security of the card data. In another exemplary preferred embodiment, the card reader 12 is adapted to prevent the communications device 18 from reading the scanned data. Card data can only pass through the communications device 18 once the encryption circuit 14 has encrypted the data. In yet another exemplary preferred embodiment, the encryption circuit 14 is adapted to prevent the network device 20 from reading the encrypted data. Programs on the network device 20 cannot intercept the encrypted data and affect the security of the card data. For example, this embodiment may prevent the encrypted data from being captured by a Trojan horse on the network device, surreptitiously relayed to a data thief, and later decrypted by the data thief In yet another exemplary preferred embodiment, the data interface 16 is adapted to prevent the network device 20 from reading interface data. The interface data contains the encrypted data and a program on the network device may compromise the security of the data by relaying the interface data to another address on the computer network 22 where the scanned data is extracted and used illegally.

In another exemplary preferred embodiment the card reader 12 is a magnetic card reader. For example, the magnetic card reader may be capable of reading data from a magnetically encoded card such as a credit, debit, or authorization card. The magnetic card reader may read the magnetically-encoded data on the card by having the card user swipe the magnetic card through the magnetic card reader by hand. Also, the magnetic card reader may be equipped with a motorized means for passing the magnetic card over the read heads in the magnetic card reader.

In another exemplary preferred embodiment the card reader 12 is an optical code reader. For example, the card may contain data in the form of a bar code. The optical code reader may be a light pen or the laser of a familiar supermarket check-out scanner. As another example, the card may contain data in the form of the pits of a compact disc in which case the optical code reader may be a set of laser diodes for scanning the pits. Additionally, the optical code reader may be a feature recognition scanner such as a fingerprint, handprint, or retinal scanner.

It should be understood that many other types of card reader are possible and the present invention is not restricted to magnetic card readers or optical code readers. Nonetheless, whatever the form of the card reader 12, the data obtained from scanning a card is not readable by the network device 20. The network device 20 is unable to obtain the scanned card data and so compromise the security of the sensitive data.

The network device 20 connects to the Apparatus 10. In yet another exemplary preferred embodiment, the network device 20 is a personal computer. For example, the Apparatus 10 may be used with a personal computer in a person's home to facilitate secure electronic commerce on the computer network 22, such as the transmission of encrypted credit card data over the Internet. As another example, the Apparatus 10 may be used with a personal computer in a store. The store-based personal computer may be acting as a point-of-sales terminal to transmit a customer's debit card data over a computer network. It should be understood that many other types of network devices are possible and that the network device 20 is not restricted to a personal computer.

In yet another exemplary preferred embodiment, the data interface 16 is a Media Access Control interface. Media Access Control ("MAC") is a media-specific access control protocol within IEEE 802 specifications. As is known in the art, the Open System Interconnection ("OSI") model is used to describe computer networks. The OSI model consists of seven layers including from lowest-to-highest, a physical, data-link, network, transport, session, application and presentation layer. The physical layer transmits bits over a communication link. The data link layer transmits error-free frames of data. The network layer transmits and routes data packets. Within this model, the MAC sub-layer resides in the data-link layer above the physical layer and controls access to a transmission medium via the physical layer. A MAC layer address is a unique number associated with a particular piece of hardware. For example, on an Ethernet local area network the MAC address is the same as the Ethernet address. In general, there is a different MAC layer for each type of hardware. In this exemplary preferred embodiment, the encrypted card data may be securely transmitted within a MAC, e.g. on a local area network.

In yet another exemplary preferred embodiment, the data interface 16 is an Internet Protocol suite interface. In the OSI model, the Internet Protocol layer roughly corresponds to the network layer, but is typically not defined as part of the OSI model. As is known in the art, the Internet Protocol is a routing protocol designed to route traffic within a network or between networks. For more information on the Internet Protocol see RFC-791, incorporated herein by reference. In this exemplary preferred embodiment, the encrypted card data may be securely transmitted within Internet Protocol messages on the Internet.

In yet another exemplary preferred embodiment, the communications device 18 is a modem. A modem resides in the physical layer in the OSI model and modulates the data from the output of the data interface 16 for transmission down a serial telephone line to the computer network 22. Most connections to a computer network from the home are via a serial telephone line through a modem. Also, most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps. Additionally, the modem may receive and demodulate data from the serial telephone line for transmission to the network device 20.

In yet another exemplary preferred embodiment, the communications device 18 is any of an Integrated Services Digital Network ("ISDN") communications device, an Asymmetric Digital Subscriber Line ("ADSL") communications device, or an Internet Protocol ("IP") communications device. As is known in the art, ISDN integrates voice, video, and data over the same network at speeds up to 128 kbps. The ISDN communications device receives the data from the output of the data interface 16 and places the data on an ISDN line for transmission to the computer network 22. As is also known in the art, ADSL is a technology for transmitting digital information on existing telephone lines and typically sends more information downstream to a user than upstream. The downstream rate is typically from 512 kbps to 6.144 Mbps. The ADSL communications device receives the data from the output of the data interface 16 and places the data on an ADSL line for transmission to the computer network 22. Additionally, an IP communications device is configured to recognize and process Internet datagrams associated with some of the protocols in the IP protocol suite. As is known in the art, the IP protocol suite includes such protocols as IP, Internet Control Message Protocol ("ICMP"), Boot Protocol ("BootP"), Address Resolution Protocol ("ARP"), Reverse Address Resolution Protocol ("RARP"), Transmission Control Protocol ("TCP"), User Datagram Protocol ("UDP"), and others. It also should be understood that many other types of communication devices are possible.

Encryption Circuit

Encryption circuit 14 encrypts the scanned card data from card reader 12, converting it to encrypted card data that is presented to the input of the data interface 16. The encryption circuit 14 can take many forms. In another exemplary preferred embodiment, the encryption circuit 14 further comprises a Programmable Logic Device ("PLD"). As is known in the art, a PLD is a device having circuit elements such as logic and flip-flops, which are linked to form a final desired configuration by interconnecting the circuit elements. The interconnections are programmable and in this manner the same PLD device can be programmed to perform a variety of logic functions. The encryption circuit 14 may comprise a PLD and some ancillary components. In this embodiment, a PLD may be configured to perform some or all of the encryption of the scanned card data.

In yet another exemplary preferred embodiment, the encryption circuit is firmware on the As communications device. The firmware may contain code for a program that encrypts the scanned card data. Many such programs are possible and their code will depend on which encryption technique is employed to encrypt the scanned card data.

Figure 2:
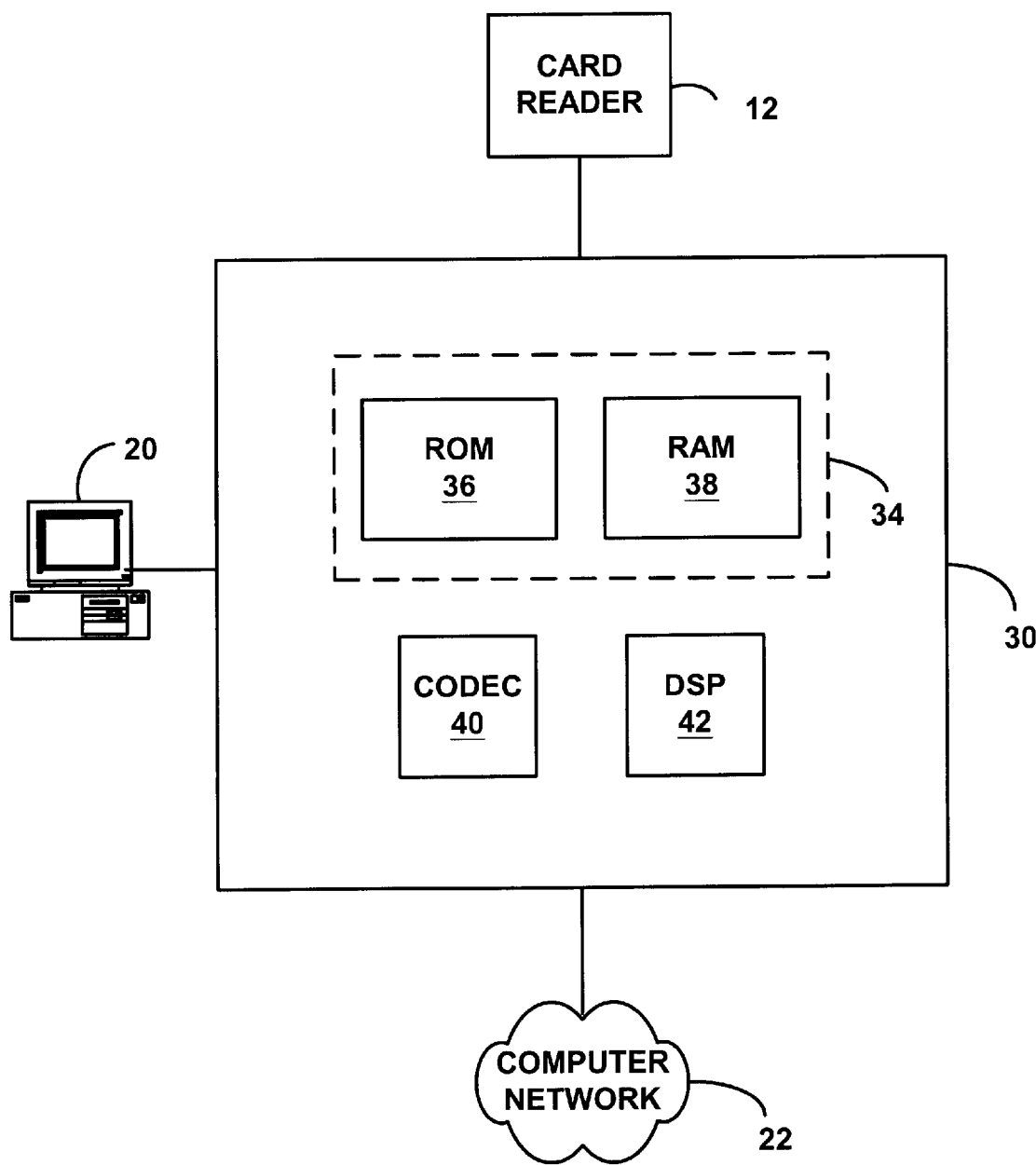
FIG. 2 is a block diagram illustrating a communications device having an encryption circuit as firmware in accordance with an exemplary preferred embodiment of the present invention.

As an illustrative example, a communications device with a firmware encryption circuit is shown in FIG. 2. Communications device 30 comprises firmware 34, a compression/decompression ("Codec") module 40, and a digital signal processor ("DSP") module 42. The firmware 34 comprises read-only memory ("ROM") 36 and random access memory ("RAM") 38. The ROM 36 may contain program space for an operating system for the communications device 30 and a program space for the encryption technique. The RAM 38 may contain data space for the communications device 30 and a data space for the encryption technique. The ROM 36 may be flash ROM, programmable read-only memory ("PROM"), or static ROM that contain code for executing a set of instructions. For example, flash ROM may be used when it is desirable to allow for flexibility in the choice of encryption technique.

When this illustrative example is in operation, the communications device 30 accepts scanned card data from the card reader 12. The scanned card data is not readable by the network device 20. The program residing in the ROM 36 executes and converts the scanned card data to encrypted data. The Codec 40, to increase transmittal speed, compresses the encrypted data. The DSP 42 processes the encrypted data and sends it to the computer network 22. The data interface 16 may be present in the firmware 34 or it may reside in the network device 20. The card data is securely transmitted to the computer network 22 because the scanned card data is immediately encrypted on the communications device 30 and is insulated from being read by a rogue application on the network device 20. It should be understood that the encryption circuit and data interface of the present invention are not limited to the above examples and that many other implementations are possible.

The encryption circuit encrypts the scanned card data before relaying them to the data interface. The encryption circuit may perform many encryption techniques. In one exemplary preferred embodiment, the encryption technique is a Data Encryption Standard ("DES") technique. As is known in the art, DES is a block cipher with 64-bit block size and uses 56-bit keys. DES is strong enough to prevent casual attempts at decryption but it can be broken with specialist hardware.

In another exemplary preferred embodiment, the encryption technique is any of a RSA technique, Secure Electronic Transaction technique, Elliptic Curve Cryptography technique, or secure hashing function technique. RSA is described in U.S. Pat. No. 4,405,829, incorporated herein by reference. The Secure Electronic Transaction ("SET") technique is a technique developed by credit card companies for the transaction of electronic commerce over the World Wide Web. A transaction using SET involves a series of security checks performed using digital certificates issued to customers, merchants, and banks. SET is described at the SETCo web site http://www.setco.org. Elliptic Curve Cryptography techniques are proposed in the Institute of Electrical and Electronic Engineers ("IEEE") standard IEEE P1363. As is known in the art, a secure hashing function technique performs an operation on data and derives a unique message digest that may be used as a secure data signature. A description of secure hashing function techniques are found in FIPS PUB 180-1 published by the National Institute of Standards and Technology. It should be understood that the encryption techniques of the present invention are not limited to the above examples and that many other techniques are possible.

Network Device Connections to the Apparatus

Figure 3:
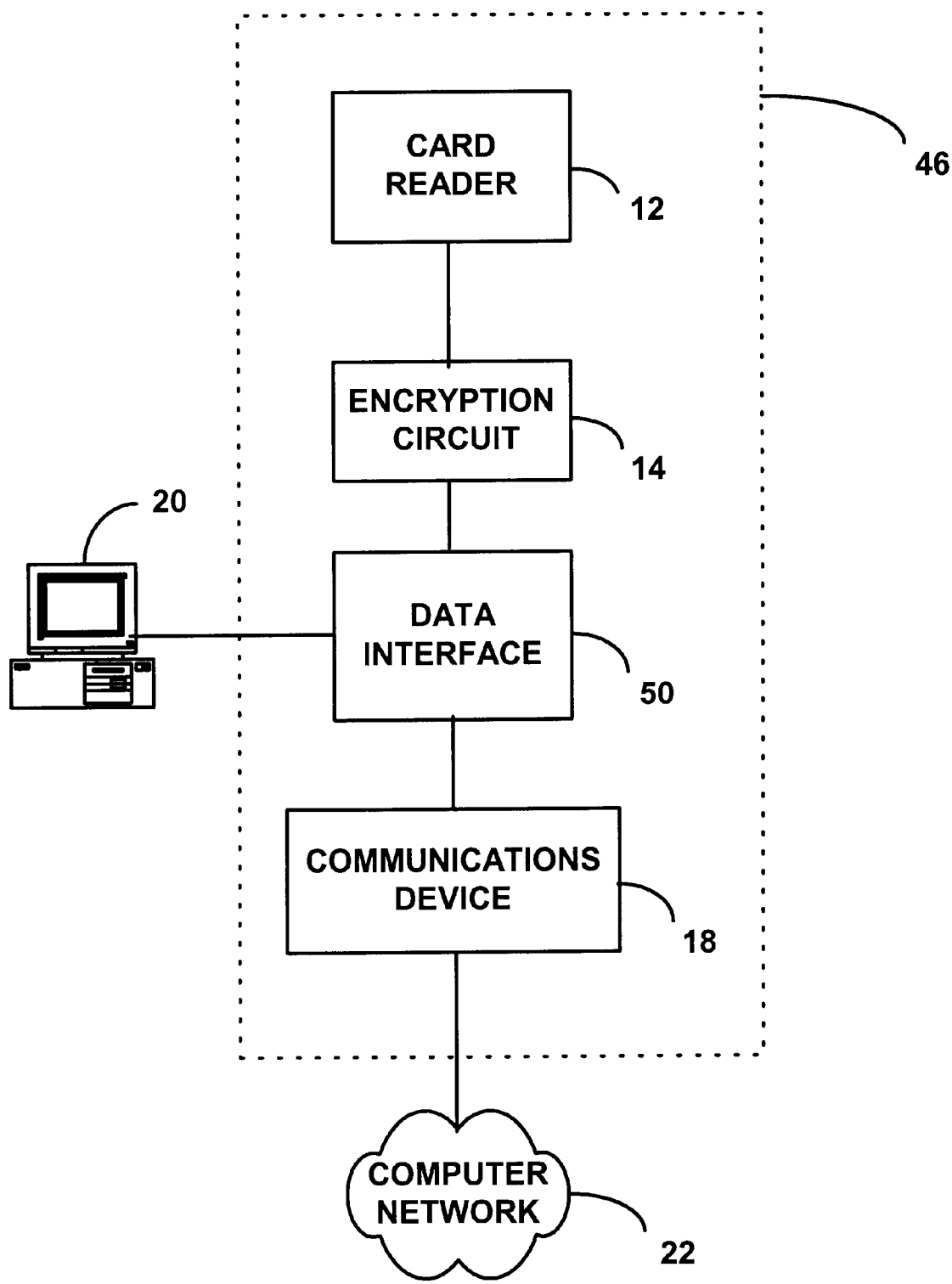
FIG. 3 is a block diagram illustrating an apparatus for the secure transmission of card data over a computer network in accordance with an exemplary preferred embodiment of the present invention.

FIG. 3 is a block diagram illustrating another exemplary preferred embodiment of the present invention. The Apparatus 46 comprises in combination a card reader 12, an encryption circuit 14, a data interface 50, and a communications device 18. The Apparatus 46 is adapted for connection to a network device 20, and the output of the communications device 18 is adapted for connection to a computer network 22. The card reader 12 includes a card reader input for receiving data obtained from scanning a card, and the card reader 12 also includes a card reader output for sending data obtained from scanning a card. The scanned card data on the card reader 12 are not readable by the network device 20.

The encryption circuit 14 is configured for encrypting card data. The encryption circuit 14 has an encryption input and an encryption output. The encryption input is connected to the card reader output. The data interface 50 has a data interface input and a data interface output. The data interface input is connected to the encryption output. The data interface 50 is adapted for connecting to the network device 20. The communications device 18 has a communications device input and a communications device output. The communications device input is connected to the data interface output and the communications device output is connected to the computer network 22.

In yet another exemplary preferred embodiment, the data interface 50 is a data interface for both the card reader 12 and the network device 20. The network device 20 communicates with the computer network 22 through the data interface 50 and the communications device 22. When a secure card transaction is requested, however, the data interface 50 may prevent communication with the network device 20 and only accept encrypted data from the encryption circuit 14 for transmission to the computer network 22 via the communications device 18. Once the encrypted data has been sent to the computer network 22, the data interface 50 may return to permitting the network device 20 to communicate with the computer network 22. The data interface 50 may be an interface such as an Internet interface or a MAC interface. Scanned data is not readable by the network device 20 and so may prevent programs on the network device 20 from capturing sensitive card data.

Figure 4:
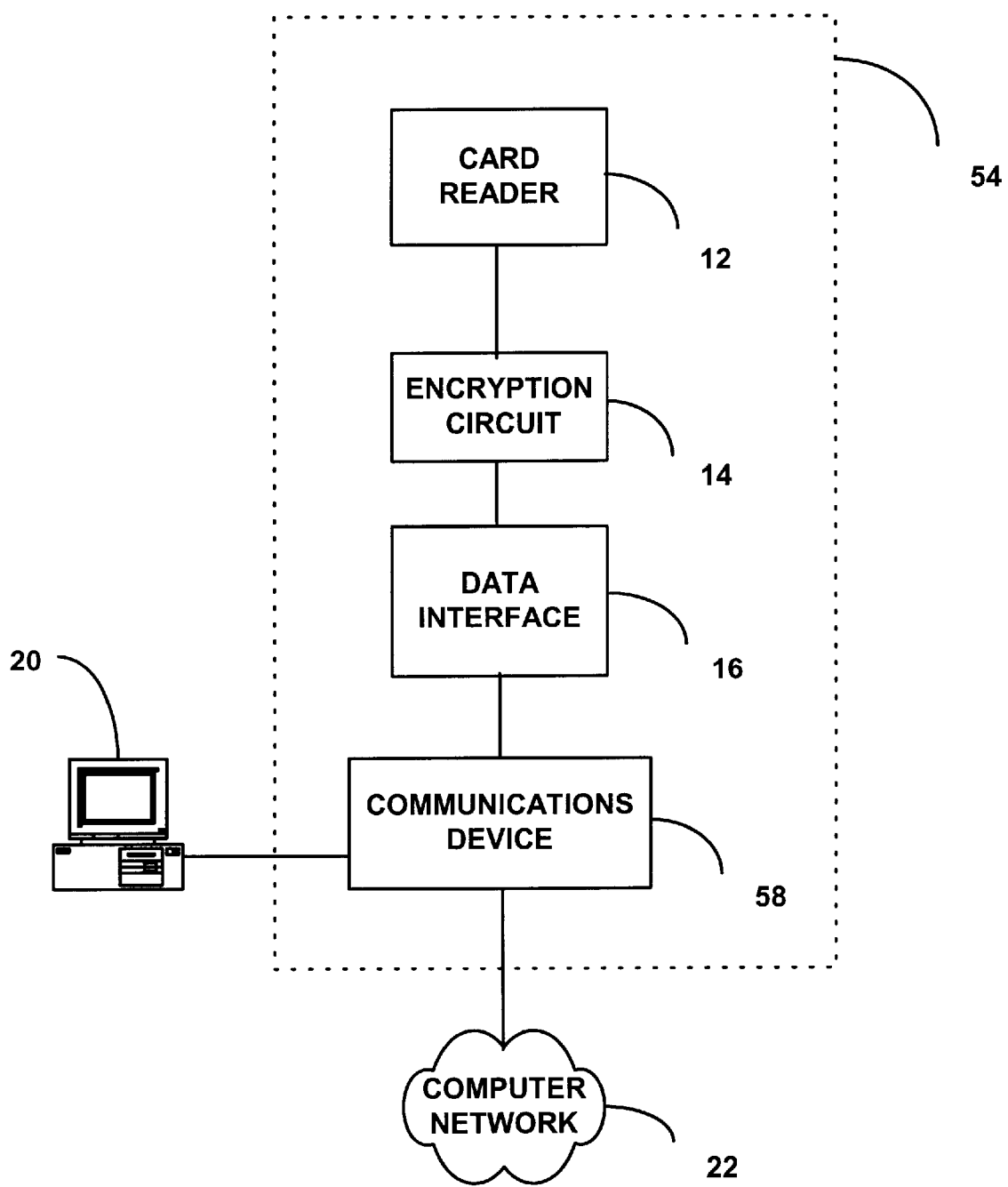
FIG. 4 is a block diagram illustrating an apparatus for the secure transmission of card data over a computer network in accordance with an exemplary preferred embodiment of the present invention.

FIG. 4 is a block diagram illustrating another exemplary preferred embodiment of the present invention. The Apparatus 54 comprises in combination a card reader 12, an encryption circuit 14, a data interface 16, and a communications device 58. The Apparatus 54 is adapted for connection to a network device 20, and the output of the communications device 58 is adapted for connection to a computer network 22. The card reader 12 includes a card reader input for receiving data obtained from scanning a card, and the card reader 12 also includes a card reader output for sending data obtained from scanning a card. The scanned card data on the card reader 12 are not readable by the network device 20.

The encryption circuit 14 is configured for encrypting card data. The encryption circuit 14 has an encryption input and an encryption output. The encryption input is connected to the card reader output. The data interface 16 has a data interface input and a data interface output. The data interface input is connected to the encryption output. The communications device 58 has a communications device input and a communications device output. The communications device input is connected to the data interface output and the communications device output is connected to the computer network 22. The communications interface 58 is adapted for connecting to the network device 58.

In yet another exemplary preferred embodiment, the communications device 58 is a communications device for both the card reader 12 and the network device 20. The network device 20 communicates with the computer network 22 through the data interface 16 and the communications device 58. When a secure card transaction is requested, however, the communications device 58 may prevent communication with the network device 20 and only accept encrypted data from the encryption circuit 14 and data interface 16 for transmission to the computer network 22 via the communications device 58. Once the encrypted data has been sent to the computer network 22, the communications device 58 may return to permitting the network device 20 to communicate with the computer network 22. The communications device 58 may be a communications device such as a modem, an ISDN communications device, an ADSL communications device, or an IP communications device. Scanned data is also not readable by the network device 20 and so may also prevent programs on the network device 20 from capturing sensitive card data.

Figure 5:
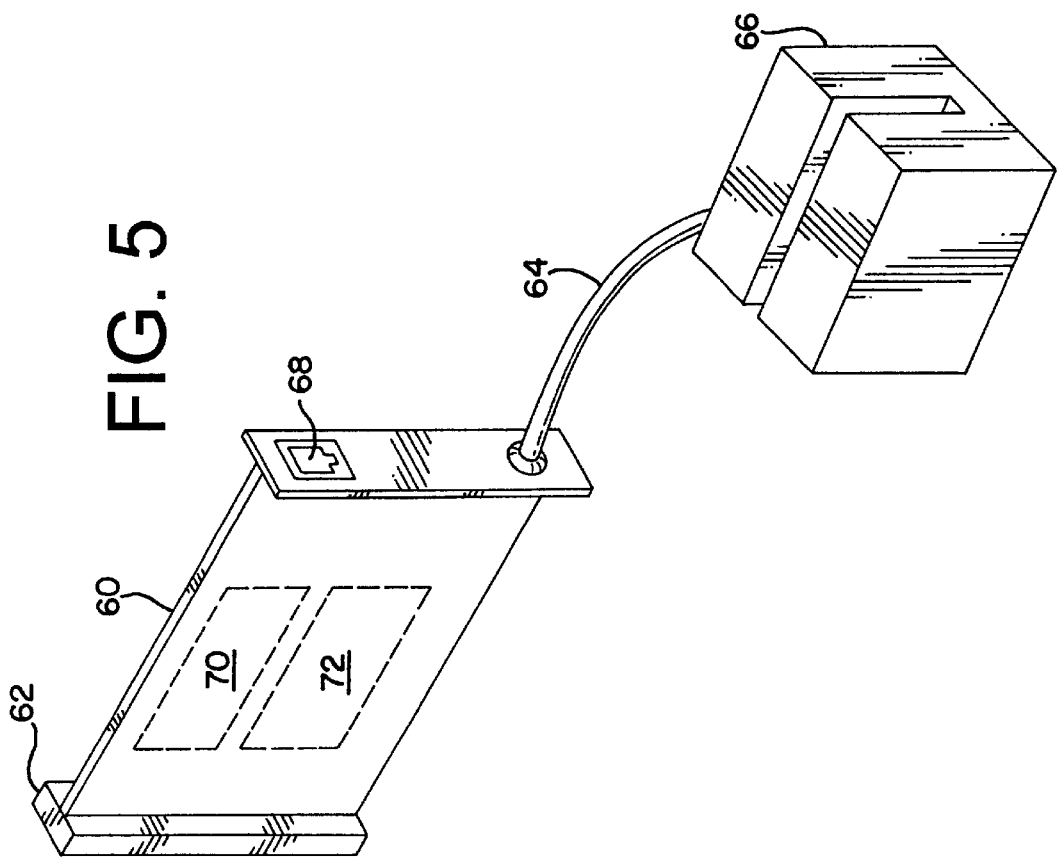
FIG. 5 is a diagram illustrating an apparatus for the secure transmission of card data over a computer network in accordance with an exemplary preferred embodiment of the present invention.

In yet another exemplary preferred embodiment, the communications device is internal to the network device. The communications device may be internal for reasons of operation, space, aesthetics, or performance. As examples, a modem card may be plugged into a card slot on a personal computer or an Ethernet card may be built into a printer. FIG. 5 illustrates one exemplary preferred embodiment of an apparatus for the secure transmission of card data over a computer network wherein the communication device is an internal modem for a personal computer. A modem card 60 is adapted for connecting to a personal computer through connector 62. A cable 64 exits from the modem card 60 to connect a card reader 66 to the apparatus. A phone jack or other connector 68 permits the modem card 60 to be connected to the computer network 22. The modem card 60 may include an encryption circuit 70 and a modem circuit 72.

In operation, the modem card 60 is plugged into a personal computer and connected up to the computer network through the connector 68. The personal computer may connect to the computer network 22 through the modem card 60. When a card transaction is required, the modem card 60 directs the consumer to swipe his card through the card reader 66. The card data is scanned by the card reader 66, encrypted in the encryption circuit 70, and sent to the computer network 22 through the modem circuit 72. The scanned card data does not cross the connector 62 and is not available to the personal computer.

Figure 6:
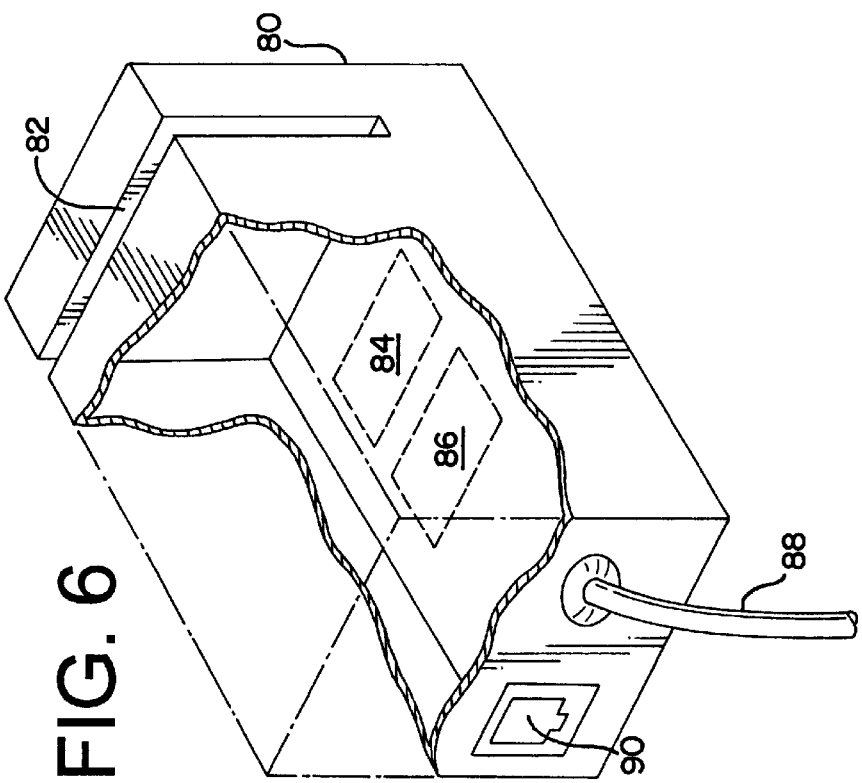
FIG. 6 is a diagram illustrating an apparatus for the secure transmission of card data over a computer network in accordance with an exemplary preferred embodiment of the present invention.

In yet another exemplary preferred embodiment of the present invention, the communication device is external to the network device. The communications device may be external for reasons of operation, security, space, or integration. As an example, the communications device may be built into the same circuit as the internal electronics of the card reader. FIG. 6 illustrates a cutaway drawing of an integrated external modem/card reader 80, comprising a card reader 82, an encryption circuit 84, and a modem circuit 86. A cable 88 permits connecting the integrated external modem/card reader 80 to a network device such as a personal computer, and the connector 90 permits connection to the computer network 22, e.g. through a Public Switched Telephone Network ("PSTN").

In operation, the integrated external modem/card reader 80 is connected to a personal computer through cable 88 and connected to the computer network through connector 90. The personal computer may connect to the computer network 22 through the integrated external modem/card reader 80. When a card transaction is required, the integrated external modem/card reader 80 directs the consumer to swipe his card through the card reader 82. The card data is scanned by the card reader 82, encrypted in the encryption circuit 84, and sent to the computer network 22 through the encryption circuit 84 and the modem circuit 86. The scanned card data does not cross the cable 88 and is not available to the personal computer.

In yet another exemplary preferred embodiment, the apparatus further comprises the network device. The network device may be integrated with the communications device, data interface, encryption circuit, and card reader. For example, a point-of-sales terminal may have a card reader built into the terminal to conserve space on a sales counter or for aesthetic reasons. Alternatively, a personal computer may have a built-in card reader as a promotion aimed at encouraging consumers to engage in electronic commerce. Moreover, an apparatus solely for the transaction of electronic commerce at the minimum requires that a web browser run on the network device and so the apparatus can be simple, cheap, and sold as an integrated unit.

Methods for the Secure Transmission of Card Data

FIG. 7 is a flow diagram illustrating a Method 100 for the secure transmission of card data over a computer network. Method 100 includes reading card data from an interface device connected to a network device at Step 102. The card data are not accessible by the network device. The card data are encrypted on the interface device before transmission at Step 104. At Step 106, the encrypted data are sent to the computer network. The encrypted card data are not readable by the network device and are not readable during data transmission.

In one exemplary preferred embodiment of the present invention, the computer network is an Internet connection and the network device is a personal computer. The interface device does not allow the card data to be accessible by the personal computer and so a rogue program on the personal computer cannot capture the card data and compromise the security of the data transmission. Also, the encrypted card data are not readable by the personal computer to further prevent capture, transmission, and decryption of the card data by a data thief. Additionally, the encrypted card data are not readable during data transmission, preventing the illegal acquisition of the encrypted data before it is received by the Internet connection.

In another exemplary preferred embodiment, the Step 102 of reading the card data comprises swiping a card through a card reader. The card may be swiped by hand or the card may be swiped through the card reader by a motorized device which passes the card over heads which pick up the data from the card. In yet another exemplary preferred embodiment, the Step 104 of encrypting the card data comprises applying the Data Encryption Standard to the card data to encrypt the card data. DES is a common encryption method for encrypting data and may be recognized by electronic retailers. In yet another exemplary preferred embodiment, the Step 106 of sending encrypted card data comprises sending the encrypted card data in an Internet Protocol packet. The interface device includes the encrypted data in an IP packet, e.g. to be routed to an electronic retailer. In yet another exemplary preferred embodiment, the Step 106 of sending encrypted card data comprises sending the encrypted card data in a Media Access Control frame. The interface device includes the encrypted data in a MAC frame, e.g. as an Ethernet frame to be routed to a host server of an in-store local area network.

FIG. 8 is a flow diagram illustrating Method 110 for the secure transmission of credit card data over an Internet connection. Method 110 includes requesting an electronic document written in a markup language on a personal computer at Step 112. A secure credit card transaction is requested at Step 114. At Step 116 a credit card is swiped through a card reader, wherein the credit card data are not accessible to the personal computer. The credit card data is encrypted at Step 118, wherein encrypted credit card data are not accessible to the personal computer. At Step 120 the encrypted credit card data is transmitted over the Internet connection. In one exemplary preferred embodiment, the electronic document is a World Wide Web page. The customer may request a World Wide Web page of a retailer and decide to purchase goods electronically from the retailer. Instead of typing her credit card numbers into the web page, the customer requests a secure credit card transaction. The customer swipes her credit card through a card reader. The credit card data is encrypted and transmitted over the Internet connection to the retailer. The retailer decrypts the credit card data and charges the requested goods to the credit card. This method of electronic commerce does not allow the credit card data in any form to be available to the personal computer and it is secure against attack by rogue data capturing programs.

It should be understood that the processes, methods, systems and apparatus described herein are not related or limited to any particular type of hardware or software, unless indicated otherwise. Various types of general purpose or specialized computer apparatus may be used with or perform operations in accordance with the teachings described herein.

It will be appreciated that the acts and symbolically represented operations include the manipulation of electrical signals. The electrical signals represent data bits which cause a resulting transformation or reduction of the electrical signal representation, and the maintenance of data bits at memory locations in the memory system to thereby reconfigure or otherwise alter a processing unit's operation, as well as other processing of signals. The memory locations where data bits are maintained are physical locations that have particular electrical, magnetic, optical, or organic properties corresponding to the data bits.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or components may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. An apparatus for the secure transmission of card data over a computer network, adapted for connecting to a network device, comprising in combination:
   a card reader including a card reader input for receiving data obtained from scanning a card, and a card reader output for sending data obtained from scanning a card, wherein scanned card data on the card reader are not readable by the network device;
   an encryption circuit configured for encrypting card data, including an encryption input connected to the card reader output and an encryption output;
   a data interface including a data interface input connected to the encryption output and a data interface output; and
   a communications device including a communications device input connected to the data interface output and a communications device output connected to the computer network.

2. The apparatus of claim 1 wherein the data interface is adapted for connecting to the network device.

3. The apparatus of claim 1 wherein the communications device is adapted for connecting to the network device.

4. The apparatus of claim 1 wherein the card reader is a magnetic card reader.

5. The apparatus of claim 1 wherein the card reader is an optical code reader.

6. The apparatus of claim 1 wherein the encryption circuit further comprises a Programmable Logic Device.

7. The apparatus of claim 1 wherein the encryption circuit is firmware on the communications device.

8. The apparatus of claim 1 wherein the network device is a personal computer.

9. The apparatus of claim 1 wherein the communications device is a modem.

10. The apparatus of claim 1 wherein the communications device is any of an Integrated Services Digital Network communications device, Asymmetric Digital Subscriber Line communications device, or Internet Protocol communications device.

11. The apparatus of claim 1 wherein the data interface is a Media Access Control interface.

12. The apparatus of claim 1 wherein the data interface is an Internet Protocol suite interface.

13. The apparatus of claim 1 wherein an encryption technique for the encryption circuit is a Data Encryption Standard technique.

14. The apparatus of claim 1 wherein an encryption technique for the encryption circuit is any of a RSA technique, Secure Electronic Transaction technique, Elliptic Curve Cryptography technique, or secure hashing function technique.

15. The apparatus of claim 1 wherein the communications device is internal to the network device.

16. The apparatus of claim 1 wherein the communications device is external to the network device.

17. The apparatus of claim 1 further comprising the network device.

18. An apparatus for the secure transmission of card data over a computer network, adapted for connecting to a network device, comprising in combination:
- a card reader, including a card reader input and a card reader output, wherein the card reader is adapted to prevent the network device from reading scanned data and adapted to prevent a communications device from reading the scanned data, and wherein the scanned data is received at the card reader input by scanning a card and the scanned data is transmitted at the card reader output;
- an encryption circuit configured for encrypting card data, including an encryption input connected to the card reader output and an encryption output, wherein the encryption circuit is adapted to prevent the network device from reading encrypted data;
- a data interface including a data interface input connected to the encryption output and a data interface output, wherein the data interface is adapted to prevent the network device from reading interface data; and
- a communications device including a communications device input connected to the data interface output and a communications device output connected to the computer network.

19. The apparatus of claim 18 wherein the card reader is a magnetic card reader.

20. The apparatus of claim 18 wherein the network device is a personal computer.

21. The apparatus of claim 18 wherein the communications device is a modem.

22. A method for the secure transmission of card data over a computer network, comprising the steps of:
- reading card data from an interface device connected to a network device, wherein the card data are not accessible to the network device;
- encrypting the card data on the interface device before transmission; and
- sending encrypted card data to the computer network;
- wherein the encrypted card data are not readable by the network device and are not readable during data transmission.

23. A computer readable medium having stored therein instructions for causing a central processing unit to execute the method of claim 22.

24. The method of claim 22 wherein the step of reading card data comprises swiping a card through a card reader.

25. The method of claim 22 wherein the step of encrypting the card data comprises applying the Data Encryption Standard to the card data to encrypt the card data.

26. The method of claim 22 wherein the step of sending encrypted card data comprises sending the encrypted card data in an Internet Protocol packet.

27. The method of claim 22 wherein the step of sending encrypted card data comprises sending the encrypted card data in a Media Access Control frame.

28. A method for the secure transmission of credit card data over an Internet connection, comprising:
- requesting an electronic document written in a markup language on a personal computer;
- requesting a secure credit card transaction;
- swiping a credit card through a card reader, wherein the credit card data are not accessible to the personal computer;
- encrypting the credit card data, wherein encrypted credit card data are not accessible to the personal computer; and
- transmitting the encrypted credit card data over the Internet connection.

29. The method of claim 28 wherein the electronic document is a World Wide Web page.

30. An apparatus for the secure transmission of card data over an Internet connection, adapted for connecting to a personal computer, comprising in combination:
- a magnetic card reader including a magnetic card reader input for receiving data obtained from scanning a magnetic card, and a magnetic card reader output for sending data obtained from scanning a magnetic card, wherein scanned magnetic card data on the magnetic card reader are not readable by the personal computer;
- an encryption circuit configured for encrypting magnetic card data, including an encryption input connected to the magnetic card reader output and an encryption output;
- an Internet interface including an Internet interface input connected to the encryption output and an Internet interface output; and
- a modem including a modem input connected to the Internet interface output and a modem output connected to the Internet connection.

31. The apparatus of claim 30 wherein the Internet interface is adapted for connecting to the personal computer.

32. The apparatus of claim 30 wherein the modem is adapted for connecting to the personal computer.

33. The apparatus of claim 30 wherein the encryption circuit is firmware on the modem.

34. The apparatus of claim 30 wherein an encryption technique for the encryption circuit is a Data Encryption Standard technique.

* * * * *